United States Patent
Sontheim et al.

(10) Patent No.: US 9,356,495 B2
(45) Date of Patent: May 31, 2016

(54) METHOD FOR SOLDERING A STATOR TO A COOLER, AND STATOR COMPRISING A SOLDER CONNECTION TO THE STATOR SUPPORT

(71) Applicant: Compact Dynamics GmbH, Starnberg (DE)

(72) Inventors: Johann Sontheim, Andechs (DE); Michael Menhart, Igling/Holzhausen (DE)

(73) Assignee: Compact Dynamics GmbH (DE)

( * ) Notice: Subject to any disclaimer, the term of this patent is extended or adjusted under 35 U.S.C. 154(b) by 0 days.

(21) Appl. No.: 14/442,867

(22) PCT Filed: Nov. 13, 2013

(86) PCT No.: PCT/EP2013/073673
§ 371 (c)(1),
(2) Date: May 14, 2015

(87) PCT Pub. No.: WO2014/079742
PCT Pub. Date: May 30, 2014

(65) Prior Publication Data
US 2015/0303778 A1    Oct. 22, 2015

(30) Foreign Application Priority Data
Nov. 22, 2012    (DE) .......................... 10 2012 022 873

(51) Int. Cl.
*B23K 31/02*    (2006.01)
*H02K 15/02*    (2006.01)
(Continued)

(52) U.S. Cl.
CPC ............... *H02K 15/02* (2013.01); *B23K 1/002* (2013.01); *B23K 1/0016* (2013.01); *B23K 31/02* (2013.01); *C25D 7/00* (2013.01); *H02K 5/20* (2013.01); *H02K 15/00* (2013.01); *B23K 2201/36* (2013.01)

(58) Field of Classification Search
None
See application file for complete search history.

(56) References Cited

U.S. PATENT DOCUMENTS 2,797,288 A * 6/1957 Kiemele ................ B23K 1/002
                                                                  219/605
4,274,021 A * 6/1981 Kamiya ................... H02K 3/22
                                                                  310/260

(Continued)

FOREIGN PATENT DOCUMENTS

DE    1627470 A1    12/1970
DE    1627451 A1    1/1971
(Continued)

OTHER PUBLICATIONS

International Search Report for PCT/EP2013/073673, mailed Apr. 1, 2014, pp. 1-20.

*Primary Examiner* — Kiley Stoner
(74) *Attorney, Agent, or Firm* — Tarolli, Sundheim, Covell & Tummino LLP

(57) ABSTRACT

A method for soldering a stator of an electric machine to a cooler is described. Firstly, the stator and/or the cooler is coated, at least partially, with a layer of solder. Then, the stator is brought together with the cooler such that the layer of solder is between the stator and the cooler. Finally, the cooler is heated to the melt temperature of the layer of solder in order to produce a solder connection between the stator and the cooler. The cooler can also act as support. Furthermore, a stator for an electric machine, comprising a stator support and a solder connection between the stator and the stator support is described.

6 Claims, 2 Drawing Sheets

(51) Int. Cl.
*B23K 1/002* (2006.01)
*B23K 1/00* (2006.01)
*H02K 5/20* (2006.01)
*H02K 15/00* (2006.01)
*C25D 7/00* (2006.01)

(56) References Cited

U.S. PATENT DOCUMENTS

| | | | | |
|---|---|---|---|---|
| 5,659,944 | A * | 8/1997 | Thiard-Laforet | H02K 3/505 228/165 |
| 5,692,314 | A * | 12/1997 | Schubert | H02K 15/0006 15/300.1 |
| 5,736,655 | A * | 4/1998 | Sekito | G01R 31/346 324/546 |
| 5,760,371 | A * | 6/1998 | Dailey | H02K 15/0093 219/129 |
| 5,796,189 | A * | 8/1998 | Manning | B23K 1/20 228/179.1 |
| 5,875,539 | A * | 3/1999 | Kilpatrick | H02K 3/505 228/119 |
| 6,232,683 | B1 * | 5/2001 | Hirai | H02K 5/18 310/59 |
| 6,875,966 | B1 * | 4/2005 | Barber | B23K 3/04 219/616 |
| 7,621,437 | B2 * | 11/2009 | Nansen | B64C 1/06 228/212 |
| 8,405,262 | B1 * | 3/2013 | Beatty | H02K 1/20 310/58 |
| 2004/0103532 | A1 * | 6/2004 | Shanahan | B23P 6/00 29/889.1 |
| 2004/0216301 | A1 * | 11/2004 | Rowe | B23K 1/0008 29/596 |
| 2005/0012408 | A1 * | 1/2005 | Kim | H02K 3/24 310/54 |
| 2005/0231051 | A1 | 10/2005 | Chen | |
| 2006/0080828 | A1 * | 4/2006 | Rowe | H02K 15/0056 29/596 |
| 2006/0091742 | A1 * | 5/2006 | Wang | C23C 18/1616 310/54 |
| 2006/0103261 | A1 * | 5/2006 | Wang | C25D 7/04 310/254.1 |
| 2006/0107519 | A1 * | 5/2006 | Wang | B23K 3/087 29/596 |
| 2006/0108355 | A1 * | 5/2006 | Breznak | H02K 15/0093 219/615 |
| 2006/0108357 | A1 * | 5/2006 | Wang | B23K 1/0004 219/615 |
| 2006/0208581 | A1 * | 9/2006 | Ikuta | H02K 5/18 310/58 |
| 2007/0068998 | A1 * | 3/2007 | Silliman | B23K 1/0008 228/179.1 |
| 2008/0115527 | A1 | 5/2008 | Doty et al. | |
| 2008/0304992 | A1 * | 12/2008 | Hooper | F04C 2/1075 418/48 |
| 2009/0179064 | A1 * | 7/2009 | Lee | B23K 1/0018 228/41 |
| 2009/0261670 | A1 * | 10/2009 | Tekawade | H02K 3/12 310/71 |
| 2011/0192158 | A1 * | 8/2011 | Simon | F16H 39/14 60/487 |
| 2011/0215659 | A1 * | 9/2011 | Amaral | H02K 5/20 310/52 |
| 2011/0285222 | A1 | 11/2011 | Chamberlin et al. | |
| 2012/0076278 | A1 * | 3/2012 | Astle | B22C 7/02 378/141 |
| 2013/0043760 | A1 * | 2/2013 | Osborne | H02K 17/165 310/211 |
| 2014/0265654 | A1 * | 9/2014 | Satterfield | H02K 9/22 310/52 |
| 2014/0368064 | A1 * | 12/2014 | Fedoseyev | H02K 9/20 310/54 |

FOREIGN PATENT DOCUMENTS

| | | | | |
|---|---|---|---|---|
| DE | 3536296 | C1 | 3/1987 | |
| DE | 4040002 | A1 | 6/1992 | |
| DE | 19651959 | A1 | 6/1998 | |
| DE | 19730865 | C2 | 12/2001 | |
| DE | 10145521 | A1 | 7/2003 | |
| DE | 102004026490 | A1 | 12/2004 | |
| DE | 202005004807 | U1 | 7/2005 | |
| DE | 102005043313 | A1 | 3/2007 | |
| DE | 102006044785 | A1 | 4/2008 | |
| DE | WO 2009062797 | A1 * | 5/2009 | B23K 9/29 |
| DE | 102008047076 | A1 | 3/2010 | |
| IT | WO 2008015707 | A1 * | 2/2008 | B24B 9/007 |
| JP | 06196256 | A * | 7/1994 | |
| JP | 06217500 | A * | 8/1994 | |
| JP | 09046975 | A * | 2/1997 | |
| RU | 2007105084 | A | 11/2009 | |
| WO | 02075901 | A1 | 9/2002 | |

* cited by examiner

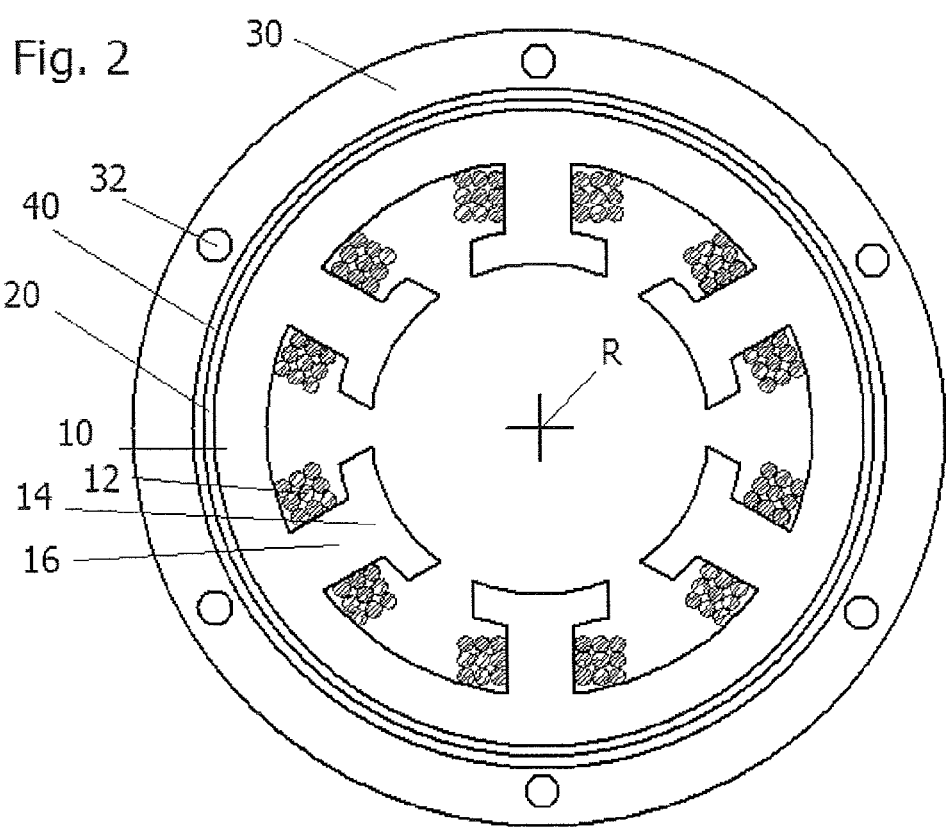
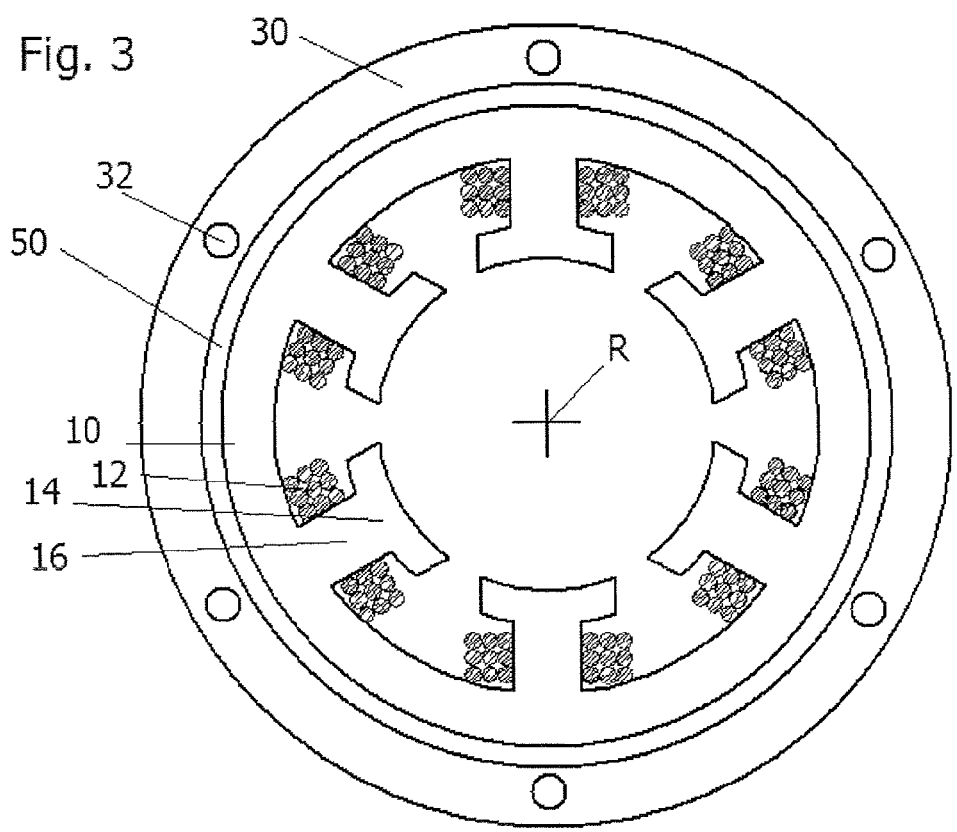

METHOD FOR SOLDERING A STATOR TO A COOLER, AND STATOR COMPRISING A SOLDER CONNECTION TO THE STATOR SUPPORT

RELATED APPLICATIONS

The present invention is a U.S. National Stage under 35 USC 371 patent application, claiming priority to Serial No. PCT/EP2013/073673, filed on 13 Nov. 2013; which claims priority from German Application No. 10 2012 022 873.2, filed 22 Nov. 2012, the entirety of both of which are incorporated herein by reference.

INTRODUCTION

A method for soldering a stator of an electric machine to a cooler is described here along with a stator for an electric machine, which stator permits improved heat dissipation of the electric machine. Furthermore, an electric machine with this stator is disclosed.

An electric machine in this case is understood to be an electric machine in the form of an internal or external rotor machine. An electric machine can be both an electric motor and an electric generator in this case. The stator described here is used in particular in turning machines of all kinds (synchronous, asynchronous, reluctance machines, permanently excited machines or the like).

Electric machines have efficiency losses due to the generation of heat in the electrical sheet of the stator due to eddy current or hysteresis effects and in the winding due to ohmic losses. This thermal energy must be discharged. In a highly efficient electric machine with roughly 5 kW/kg for the stator core, roughly 10 percent of its power should be discharged as heat, even with an optimal design. Such a machine can only be operated with highly efficient cooling, therefore, so that the temperature in the stator core and/or the winding does not exceed the limit temperature of the materials used. For an external rotor machine, cooling is suggested via the inside of the stator, for example. For an internal rotor machine, cooling is suggested via the outside of the stator, for example.

PRIOR ART

An internal rotor motor is known from DE 196 51 959 A1 into the stator casing of which a stator core stack is cast. For cooling purposes a cooling tube coil winding around the stator core stack is provided, which coil is integrated into the unit formed by the stator casing and the stator core stack. The cooling tube coil can be formed from a metal tube with an oval or flattened oval cross section.

WO 2002/075901 A1—Compact Dynamics—discloses a fluid-cooled electric machine with a casing, in which a stator and a rotor are arranged with stator and/or rotor coils. The electric machine is coupled in a heat conducting manner to a cooling device arranged on its circumference and connected to an electronic power controller. The electronic power controller is divided into several modules, which are each connected electrically to at least one of the stator or rotor coils. The modules are distributed on the circumference of the electric machine and arranged lying radially externally or internally on the cooling device and coupled to the latter in a heat conducting manner. The cooling device is penetrated by fluid channels and has on its external or internal wall an opening to at least one of the fluid channels, into which cooling elements arranged on the modules protrude.

In such known systems the stator elements (segments or rings) are bonded by thermally conductive adhesive to the cooler/stator support. The thermally conductive value of the adhesive restricts the power loss to be discharged. Due to the temperature gradient at the adhesive, differential temperatures occur between stator and cooler/stator support, which leads to different expansions and thus to damage to the adhesive. Damage to the adhesive can lead to a loss of thermal conduction and the mechanical connection between the stator and the cooler/stator support, and thus to system failure.

DE 10 2005 043 313 A1 discloses a rotating electric machine with a liquid-cooled stator, DE 101 45 521 A1 a cooling system for an electric motor with a heat exchanger discharging heat from the stator and DE 10 2006 044 785 A1 a liquid-cooled electric machine with a cooling system with a corrosion-resistant cooling structure. DE 197 30 865 C2 describes a heat sink arrangement for cooling electronic components or circuit boards made from ceramic materials.

DE 10 2004 026 490 A1 discloses a method for applying solders to basic materials by way of a thermal spraying process and DE 1 627 541 A discloses a method for achieving uniform solder gaps between workpieces with curved solder surfaces. A method is also known from DE 1 627 470 A for soldering babbit metal bushes into holes of a basic material.

DE 10 2008 047 076 A1 describes a solder component with solder deposit and a heat exchanger that is provided with this solder component, DE 20 2005 004 807 U1 describes a component of aluminium material with a surface coating for hard soldering and DE 35 36 296 C1 describes a camshaft with a shaft soldered into a hole in the cam.

Underlying Problem

The thermal conductivity value of the coupling material is to be increased in a cooled stator of an electric machine. In addition, the stability of the thermal and mechanical connection between the components is to be improved.

Proposed Solution

For the solution a method for soldering a stator of an electric machine to a cooler is proposed. Firstly, the stator and/or the cooler is coated, at least partially, with a layer of solder. Then, the stator is brought together with the cooler such that the layer of solder is between the stator and the cooler. Finally, the cooler is heated to the melt temperature of the layer of solder, in order to produce a solder connection between the stator and the cooler.

The cooler can also act as support in this case.

As a further solution, a stator for an electric machine is proposed with a stator support and a solder connection between the stator and the stator support.

The stator support can also act as cooler in this case.

These solutions lead to very good thermal contacting between stator and cooler/support. Furthermore, the solder facilitates a lasting thermal and mechanical connection between the components. Due to the stable thermal connection of the stator to the cooling system, significantly higher power losses can be led away. This makes it possible to increase the motor power of the electric machine.

In summary, these solutions facilitate the best possible thermal coupling to the cooler for heat dissipation of the stator. Since the cooler can additionally act as support, all forces that act on the stator are conducted away via the—very sturdy—solder connection into the cooler/stator support.

Attributes and Configurations of the Method and the Stator

The rotor/stator support can contain steel. The stator can contain sheet moulding composite (SMC) material.

In the proposed method, the solder material can contain tin, and/or the solder connection can contain tin on the proposed stator. Thus no aggressive flux agent is required, so that damage to the stator due to such a flux can be avoided.

With known solder additive materials, which are applied as paste or foil to the components, wiping off of the paste and/or an undefined layer of brazing foil occur when assembling the components. The consequence of this hard to control coating of the stator surface with the paste/foil in the heating step is that a defective thermal connection is created between the stator and the cooler. In operation this can lead to hot running of the electric machine and even to a short circuit in the winding.

To avoid this problem, the coating step can be carried out by electroplating the stator and/or the cooler with tin. Then these components are joined together "dry", so that a uniform distribution of the solder material is ensured in preparation for the heating step.

Embodiments are conceivable here in which only one tin layer is provided. For example, only the stator can have a tin layer, wherein the cooler has no tin layer, or vice versa.

Furthermore, the tin layers do not have to run unbroken along the circumferential surfaces of the stators or coolers. The tin layers can contain recesses, for example, or only be applied at points or in places to the stator and/or cooler.

In one possible embodiment, the stator tin layer and the cooler tin layer can complement one another in such a way that the tin layers together form a single uninterrupted solder layer when the stator is brought together with the cooler. However, the composition of the tin layers can also have symmetrical or asymmetrical recesses or gaps.

The stator support or cooler can be passed through by at least one fluid channel. The at least one fluid channel can run either substantially coaxially to the central longitudinal axis of the cooler/stator support or pass through the cooler/stator support spirally or in the manner of a helix.

The fluid channels of the cooler can have a one-to-one ratio to the stator windings of the stator here. Alternatively to this, the ratio of the number of fluid channels to the number of stator windings can be varied in any way. The fluid channels and/or stator windings can be arranged respectively regularly or irregularly, symmetrically or asymmetrically about an axis of rotation of the electric machine. Furthermore, the fluid channels and stator windings can be arranged along a line to the axis of rotation or offset to one another. Any combination of collinear and offset fluid channels and stator windings would be conceivable here.

In the step of heating, the cooler is heated by a heat transfer fluid flowing through the fluid channel. Due to this, only the solder area is heated above the melt temperature, so that temperature-sensitive components such as the windings of the stator are heated much less due to the thermal resistance of the stator material. These temperature-sensitive components are thus not damaged in the heating step. In addition, a much lower solder energy is required than if the entire module had to be heated to the melt temperature.

Alternatively to this, the step of heating can take place in that firstly a small quantity of high-boiling liquid is poured into the at least one fluid channel. The cooler is then heated inductively on its side facing away from the stator until the boiling liquid evaporates. Finally the boiling liquid condenses again in the fluid channel to heat the layer of solder to its melt temperature. Due to the high phase change energy of the boiling liquid, a fast and uniform heating of the solder area takes place.

With this configuration an internal pressure of the fluid channel can be limited by a pressure relief valve, so that the pressure arising due to the evaporating medium remains stable until the cooler is heated through. It is thus ensured that no excessively high internal pressure is created.

On internal rotor machines, an outer circumferential surface of the stator and/or an inner circumferential surface of the cooler can be coated, at least partially, with the layer of solder in the step of coating.

On external rotor machines, an outer circumferential surface of the cooler and/or an inner circumferential surface of the stator can be coated, at least partially, with the layer of solder in the step of coating.

An electric machine can be equipped with a stator or the configuration described here.

BRIEF DESCRIPTION OF THE DRAWING

Further details, features, advantages and effects of the method described here and of the stator described here result from the following description and from the drawings.

FIG. 2 shows an axially directed schematic view of the end face of an assembled module with the stator and the cooler/stator support, and FIG. 3 shows the module according to FIG. 2 with a finished solder connection.

DETAILED DESCRIPTION OF THE DRAWING

Figure 1A:
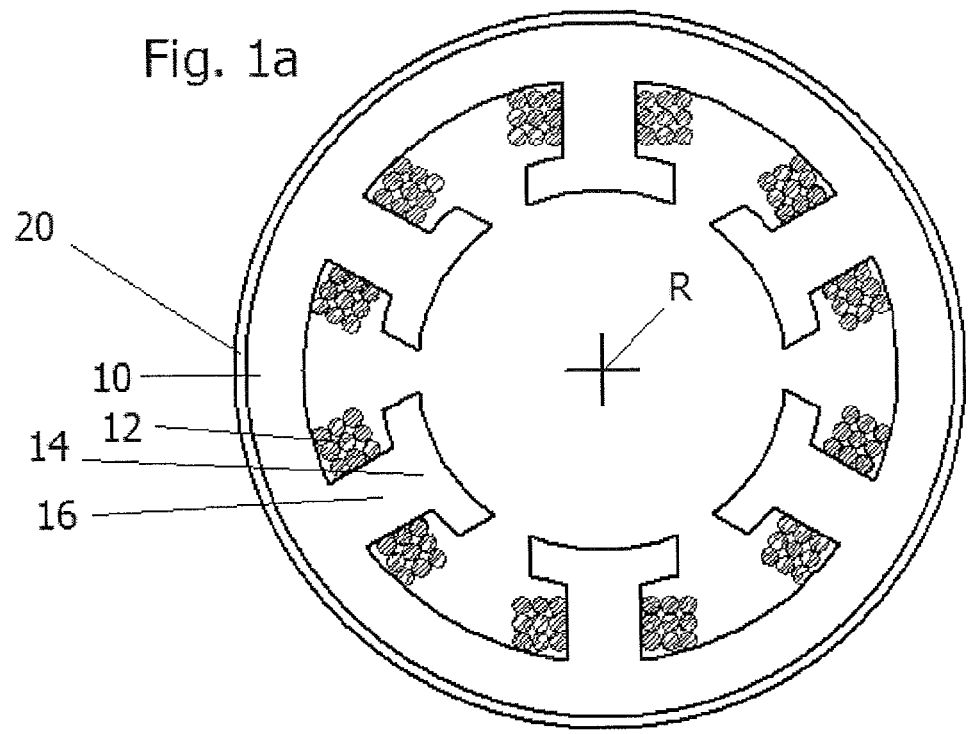
FIG. 1A shows an axially directed schematic view of the end face of a stator.

As illustrated in FIG. 1A, the stator 10 shown (here a direct current machine) is provided on its inner circumference with a plurality of take-up grooves for stator windings 12. The stator windings 12 each enclose a pole core 16. Each pole core 16 has a pole shoe 14 on its end directed towards an axis of rotation R. An opening adjacent to the take-up grooves serves to receive an internal rotor (not shown), which is provided for rotation about an axis of rotation R.

The stator 10 can comprise a stator core in this case, with several stacked layers, so-called stator stacks, stator rings or stator segments, which are layered in magnetic flux direction and thus perpendicular to the eddy current direction. The stacked layers preferably comprise two-dimensional fibre composite workpieces, which contain a sheet moulding composite (SMC) material, for example. A layer material can be arranged between adjacent layers, which material is used among other things for adhesion, for example.

Applied to the outer circumference of the stator 10 is a layer of tin 20, which acts as solder additive. The stator 10 is preferably electroplated with tin by immersing the stator 10 in a tin electrolyte following a suitable pretreatment. Due to the application of an electric voltage a tin plating is deposited on the surface of the stator 10. The stator 10 acquires a preferably minimal layer thickness as coupling layer. If the stator 10 should comprise a stator core with several stator rings/segments, the tin layer 20 is covered at the defined solder surface at the edge of the stator rings/segments and then the areas lying between the stator rings/segments are etched off to avoid harmful eddy currents.

Figure 1B:
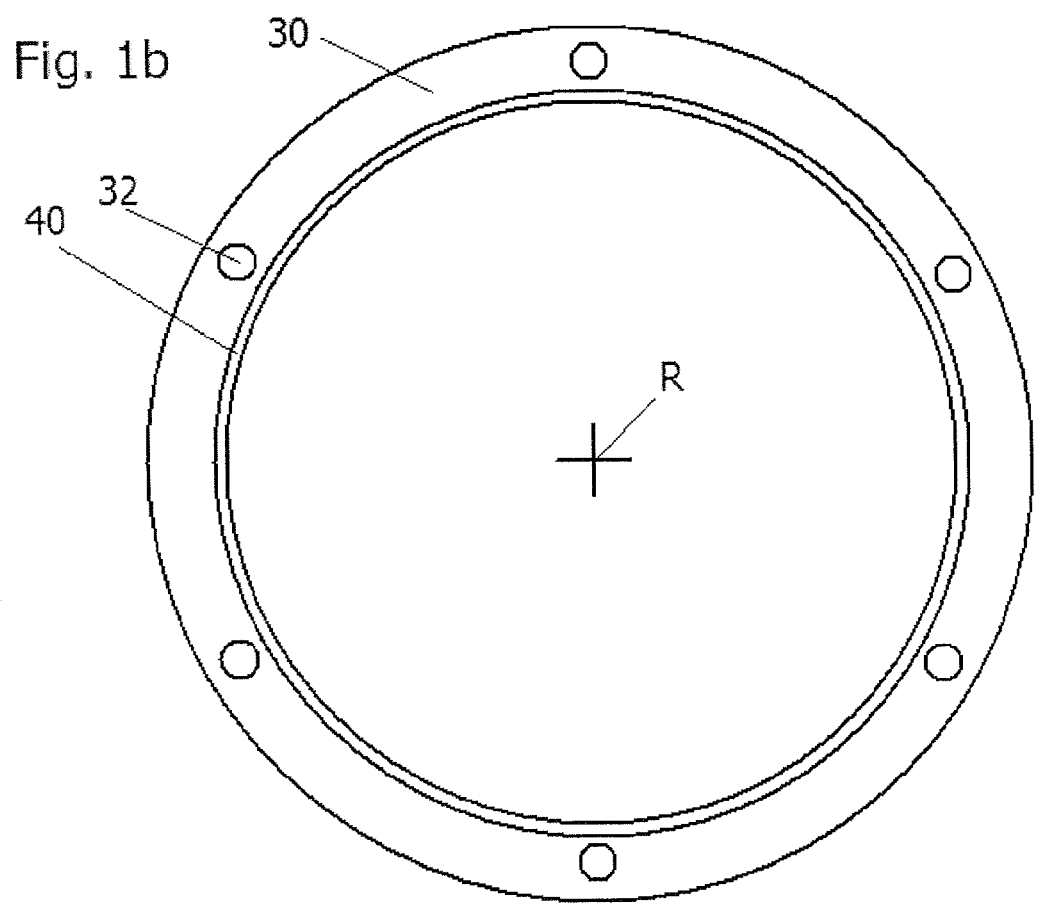
FIG. 1B shows an axially directed schematic view of the end face of a cooler/stator support.

FIG. 1B illustrates a cooler 30. Instead of a cooler 30 according to FIG. 1B a stator support can be provided. Alternatively to this, the cooler 30 can serve at the same time as stator support. The cooler/stator support 30 preferably contains steel or a similarly rigid material.

Provided in the radially outer area of the cooler 30 are several fluid channels 32, through which a cooling fluid flows in the operating mode. The fluid channels represent a closed system in that they form a circuit through which the liquid, cooled by an external source, flows. The fluid channels 32 pass through the cooler 30 in an axial direction (coaxially to the axis of rotation R). Alternatively to this, the fluid channels 32 can pass through the cooler 30 in the form of a spiral and surround the axis of rotation R helically.

In the case of an external rotor machine (not shown here), one or more central fluid channels can also be provided, which are mounted in the centre of the cooler coaxially to the axis of rotation.

Like the stator 10, the cooler/stator support 30 is also electroplated with tin. Following a suitable pretreatment the cooler/stator support 30 is immersed in a tin electrolyte. Due to the application of an electric voltage, a tin plating is deposited on the surface of the cooler/stator support 30. This layer of tin 40 acts as solder additive. The amount of solder required is adjusted by the layer thickness on the cooler/stator support 30.

The tin layers 20, 40 can consist exclusively of tin, or alternatively of an alloy or other mix of tin and other metals and/or materials. Here the mix used for the stator tin layer 40 can differ from that used for the cooler tin layer 40. Layers of solder that consist exclusively of materials other than tin would also be conceivable instead of tin layers 20, 40.

In FIG. 2 the assembled module with the stator 10 and the cooler 30 is illustrated. The stator 10 from FIG. 1A is brought together with the cooler 30 from FIG. 1B such that the respective tin layers 20, 40 lie on one another. FIG. 2 shows six fluid channels 32 and six stator windings 12, which are arranged in such a way that a fluid channel 32 lies axially offset to each stator winding 12. In operation the stator 10 is heated by the electric power supplied to the stator winding 12. The loading of the stator 10 by the high temperatures is location-dependent due to the temperature distribution in the stator. The fluid channels 32 accordingly run in the vicinity of the stator windings 12.

After stator 10 and cooler 30 have been brought together according to FIG. 2, these components are soldered. The tin layers 20, 40 are heated to their melt temperature to produce a finished soldered connection 50 as illustrated in FIG. 3. This soldered connection 50 does not have to be unbroken, however, as drawn in FIG. 3, but can have one or more interruptions or recesses. These can either be caused by incomplete tinning, or be created by soldering of the existing tin layers 20, 40 in places, for example by only selective heating of the tin layers.

The necessary heating to achieve the soldering of the tin layers 20, 40, at least partially, can take place in different ways. It is to be noted here that an insulating material coating the stator windings 12 is not damaged by this, and no aggressive flux agents are necessary.

In one embodiment, heating of the module is carried out by loading the fluid channels 32 with a heat transfer fluid, which is heated to a temperature above the melt temperature. Due to the heating by means of fluid channels 32 only the tin layers 20, 40 are heated to above the melt temperature. Temperature-sensitive components such as the stator windings 12 are heated much less on account of the thermal resistance of the stator material and they are thus not damaged.

The heat transfer fluid can be any fluid, for example a gas, that is not explosive at high temperatures, or a liquid, which has such a viscosity at the melt temperature of the layers of solder 20, 40 that loading of the fluid channels 32 with the heat transfer liquid is possible. To send the heat transfer fluid through the fluid channels 32, an external source of the fluid, which is under pressure, is provided in a first variant and in a further variant an external pump is provided. To heat the heat transfer fluid, an external heat source is provided, for example.

Alternatively to this, in a further embodiment, a small quantity of high-boiling liquid, for example Galden HAT 240, is poured into the fluid channels 32 to heat the tin layers 20, 40. The cooler 30 is then heated inductively from the side facing away from the stator 10. The boiling liquid evaporates and condenses out along the fluid channels 32 again. Due to the high phase change energy of the boiling liquid, rapid and uniform heating of the tin layers 20, 40 takes place.

The boiling liquid has a boiling point in the region of the melt temperature of the tin layers 20, 40. Furthermore, the boiling liquid is selected so that it is not explosive even at high temperatures.

In order to ensure that the pressure in the fluid channels 32 due to the evaporating medium remains stable up to heating through of the cooler, an external pressure relief valve is provided in one variant so that no excessive increase in the internal pressure in the fluid channels 32 occurs.

The variants described above only help to understand the structure, function and properties of the stator and the soldering method better; they do not restrict the disclosure to the embodiments, for example. The figures are partially schematic, wherein substantial attributes and effects are shown clearly enlarged in part, in order to clarify the functions, operating principles, technical configurations and features. Each function, each principle, each technical configuration and each feature, which is/are disclosed in the figures or in the text, can be combined freely and in any way here with all claims, each feature in the text and in the other figures, other functions, principles, technical configurations and features that are contained in this disclosure or result from it, so that all conceivable combinations are to be ascribed to the stator described and the soldering method described. Even combinations between all individual executions in the text, meaning in each section of the description, in the claims and also combinations between different variants in the text, in the claims and in the figures are included here.

The claims also do not limit the disclosure and thus the combination possibilities of all features shown with one another. All disclosed features are explicitly disclosed here also individually and in combination with all other features.

The invention claimed is:

1. Method for soldering a stator of an electric machine to a cooler with the steps:
   coating of the stator and/or the cooler, at least partially, with a layer of solder;
   bringing together of the stator with the cooler such that the layer of solder is between the stator and the cooler; and
   heating of the cooler to the melt temperature of the layer of solder, in order to produce a solder connection between the stator and the cooler,
   wherein the cooler is passed through by at least one fluid channel, characterised in that the step of heating comprises the steps:
   pouring of a high-boiling liquid into the fluid channel;
   inductive heating of the cooler on its side facing away from the stator up to evaporation of the boiling liquid; and
   condensing of the boiling liquid in the fluid channel, in order to heat the layer of solder to its melt temperature.

2. Method according to claim 1, wherein the solder material contains tin.

3. Method according to claim 2, wherein the coating step is achieved by electroplating the stator and/or the cooler with tin.

4. Method according to claim 1, wherein the cooler also acts as a support.

5. Method according to claim 1, wherein an internal pressure of the fluid channel is limited by a pressure relief valve.

6. Method according to claim 1, wherein the electric machine is an external rotor machine, and in the step of coating an outer circumferential surface of the cooler and/or an inner circumferential surface of the stator is coated, at least partially; or wherein the electric machine is an internal rotor machine, and in the step of coating an outer circumferential surface of the stator and/or an inner circumferential surface of the cooler is coated, at least partially.

* * * * *